United States Patent [19]
Shirato et al.

[11] 3,725,330
[45] Apr. 3, 1973

[54] SELF-ADHESIVE INSULATING COMPOSITION

[75] Inventors: Akira Shirato; Nishizawa Hitoshi; Sawada Seizo, all of Yokohama, Japan

[73] Assignee: Showa Electric Wire & Cable Co., Ltd., Kawasaki-shi, Japan

[22] Filed: Apr. 2, 1970

[21] Appl. No.: 25,287

[30] Foreign Application Priority Data

Nov. 2, 1969  Japan ........................ 44/89160

[52] U.S. Cl. ............ 260/33.6 AQ, 156/334, 260/38, 260/41.5 R, 260/41.5 A, 260/889, 260/897 A
[51] Int. Cl. ........ C08c 11/22, C08d 9/08, C08d 9/12
[58] Field of Search ...260/889, 33.6 AQ, 38, 41.5 R, 260/41.5 A; 156/334

[56] References Cited

UNITED STATES PATENTS

| | | | |
|---|---|---|---|
| 3,539,525 | 1/1972 | Raimondi | 260/897 A |
| 3,470,127 | 9/1969 | Snell et al. | 260/889 |
| 3,378,512 | 4/1968 | Hamed et al. | 260/889 |
| 3,402,140 | 9/1968 | Bickel et al. | 260/889 |
| 3,514,417 | 5/1970 | Bickel et al. | 260/889 |

OTHER PUBLICATIONS

Skeist–Handbook of Adhesives (Reinhold, N.Y., 1962), page 228, TP. 968 S5.
Skeist–Handbook of Adhesives (Reinhold, N.Y., 1962), pages 188–190, 586–587. TP. 968 S5.
Morton–Introduction to Rubber Technology (Reinhold, N.Y., 1959), page 2. TS 1890 M66.

*Primary Examiner*—Allan Lieberman
*Assistant Examiner*—H. H. Fletcher
*Attorney*—Craig, Antonelli and Hill

[57] ABSTRACT

A self-adhesive insulating tape excellent in electrical properties and weather resistance can be prepared by shaping into a sheet a novel composition comprising (A) an ethylene-propylene-diene terpolymer, (B) an ethylene-propylene copolymer, (C) a tackifier selected from the group consisting of low molecular weight polyisobutylenes, terpene resins, coumarone-indene resins and novolak type phenol resins, (D) an inorganic filler and (E) a vulcanizing agent capable of vulcanizing only the ethylene-propylene-diene terpolymer in this composition, vulcanizing the sheet and then cutting it to a given width. Said self-adhesive insulating tape is extremely suitable for forming insulating layers in connecting high voltage cables or in treating terminals.

34 Claims, No Drawings

SELF-ADHESIVE INSULATING COMPOSITION

This invention relates to an improvement of an insulating composition for self-adhesive tapes used for forming insulating layers chiefly in connecting high voltage cables or in treating terminals. More particularly, the invention is concerned with a self-adhesive insulating composition excellent in electrical properties and weather resistance and composed mainly of an ethylene-propylene-diene terpolymer.

Heretofore, self-adhesive insulating tapes have extensively been used for the purpose of forming insulating layers in connecting electric wires or cables or in treating terminals. These tapes of the prior art are prepared by shaping into the form of tapes a composition comprising butyl rubber as the main ingredient, a polyisobutylene, a hydrocarbon plasticizer and a vulcanizing agent, followed by vulcanization, and have such characteristic that when wound around substrates, they cause cold flow to self-adhere into one body. Such conventional self-adhesive insulating tapes are not only high in insulation resistance but also relatively high in breakdown voltage, and hence have frequently been used for forming insulators for low voltage electric wires or cables. On the other hand, however, they are low in resistance to weather and tracking and have such drawbacks that when used for high voltage wires or cables, they are damaged at an early stage. Moreover, the electric properties thereof, such as breakdown voltage, dielectric constant, dielectric loss tangent, etc., are also not sufficient for application to high voltage electric wires or cables.

A principal object of the present invention is to provide a novel insulating composition composed mainly of an ethylene-propylene-diene terpolymer and suitable for a self-adhesive tape improved in weather resistance, tracking resistance and other electric properties and thus successfully usable for forming insulating layers in connecting high voltage electric wires or cables or in treating terminals.

The composition of the present invention comprises (A) 100 parts by weight of an ethylene-propylene-diene terpolymer, (B) 50 – 100 parts by weight of an α-olefin polymer selected from ethylene-propylene copolymers and high molecular weight polyisobutylenes, (C) 10 – 80 parts by weight of a tackifier selected from low molecular weight polyisobutylenes, terpene resins, coumarone-indene resins and novolak type phenol resins, (D) 50 – 200 parts by weight of an inorganic filler and (E) 1 – 20 parts by weight of a vulcanizing agent capable of vulcanizing only the ethylene-propylene-diene terpolymer in this composition. By shaping this composition into a sheet, and vulcanizing and cutting the sheet to a given width according to an ordinary procedure, there is obtained a self-adhesive insulating tape excellent in electrical properties including weather resistance and tracking resistance.

The ethylene-propylene-diene terpolymer, which is the main constituent of the present composition, is composed of ethylene and propylene in an ethylene : propylene molar ratio of 80 : 20 – 20 : 80 and 0.5 – 10 mole percent, based on the total amount of said ethylene and propylene, of a diene component. Examples of such diene component include dicyclopentadiene, ethylidenenorbornene, hexadiene-1,4 cyclooctadiene-1,5 and cyclooctadiene-1,4. The ethylene-propylene-diene terpolymer used in the present invention is required to have a Mooney viscosity ($ML_{1+4}$, 100°C.) of 20 – 120. If the molar ratio of ethylene to propylene is outside the above-mentioned range or the Mooney viscosity is more than 120, the hardness of the composition becomes excessively high, while if the Mooney viscosity is less than 20, the composition is undesirably deteriorated in mechanical and electrical properties. An ethylene-propylene-diene terpolymer containing ethylene and propylene in an ethylene : propylene molar ratio of 40 : 60 or more is particularly excellent in electrical properties and is preferable for use in the present invention.

Examples of commercially available ethylene-propylene-diene terpolymers, which are usable in the present invention, are EPT No. 1045 (trade name of Mitsui Petrochemical Co.), Nordel No. 1040 (trade name of Du Pont, U.S.A.), Royalene No. 301 and Royalene No 501 (trade names of Uniroyal Co., U.S.A.) and Vistaron 2504 (trade name of Esso Standard Co., U.S.A.).

The ethylene-propylene copolymer used in the present invention has an ethylene : propylene molar ratio of 60 : 40 – 40 : 60 and a Mooney viscosity ($ML_{1+4}$, 100°C.) of 20 – 120, and the high molecular weight polyisobutylene has a molecular weight of 50,000 – 110,000. Either of them is blended in an amount of 50 – 150 parts, preferably 90 – 110 parts, by weight per 100 parts by weight of the ethylene-propylene-diene terpolymer. If the ethylene : propylene ratio of the ethylene-propylene copolymer is outside the above-mentioned range, the hardness of the composition becomes so high as to be undesired. Each of these α-olefin polymers has such an action that when the composition is vulcanized, the said polymer uniformly disperses in the meshes of the molecules of vulcanized ethylene-propylene-diene terpolymer to impart proper plasticity and tackiness to the composition. Accordingly, if the amount of said polymer blended is excessively small, the composition becomes low in ratio of unvulcanized portion to vulcanized portion and becomes poor in plasticity and tackiness. Conversely, if the amount of said polymer blended is excessively large, the composition is increased in plasticity and tackiness but becomes low in elasticity and mechanical strength.

Examples of the tackifier used in the present invention include polyisobutylenes having an average molecular weight of 300 – 10,000, terpene resins having an average molecular weight of 300 – 3,000, coumarone indene resins having an average molecular weight of 400 – 1,200, and novolak type phenol resins having an average molecular weight of 200 – 1,300. These tackifiers further supplement the tackiness imparted by the α-olefin polymers. Among these, polyisobutylenes and terpene resins less affect the electrical properties of the composition and hence are particularly preferable. These tackifiers are used, according to the uses of the resulting compositions, in amounts of 10 – 80 parts by weight per 100 parts by weight of the ethylene-propylene-diene terpolymer. In case a novolak type phenol resin having a molecular weight of 800 or more is used alone, the resulting composition becomes somewhat hard. Accordingly, if a soft resin is desired to be obtained, it is desirable that the novolak type resin is used in a relatively small amount, or in combination with other tackifiers.

The inorganic filler used in the present invention has such actions as to facilitate the operation of shaping a tape from the composition and prevent the tape from shrinkage during vulcanization, and display such an effect as to increase the mechanical strength of the tape. Examples of inorganic fillers preferable for use in the present invention include platy talc, calcined clay, dixie clay and calcium carbonate having an average particle diameter of 0.5 – 50 $\mu$. If the amount of the filler therefor blended is less than 50 parts by weight, the effect of shrinkage prevention cannot be attained, while if the amount is more than 200 parts by weight, the resulting tape is poor in self-adhesiveness. Accordingly, the filler therefor should be used in an amount within the range of 50 – 200 parts by weight.

As vulcanizing agents usable in the present invention, there are (1) a combination of sulfur with such a vulcanizing accelerator as mercaptobenzothiazole, dimercaptobenzothiazole or tetramethylthiuram monosulfide, (2) a peroxide such as dicumyl peroxide or t-butyl peroxide, (3) p-quinone dioxime or p,p'-benzoyl quinone dioxime, (4) a combination of a resin type vulcanizing agent, e.g., a phenol resin type bromomethyl phenol-aldehyde resin, with stannic chloride, and (5) a combination of two or more of said (1) to (4). The most preferable results are obtained when the amount of the vulcanizing agent blended per 100 parts by weight of the ethylene-propylene-diene terpolymer is 0.1 – 3 parts by weight of sulfur and 0.5 – 3.5 parts by weight of the vulcanization accelerator in the case of said (1), 2 – 4 parts by weight of the peroxide in the case of (2), 3 – 7 parts by weight of the dioxime in the case of (3) and 7 – 12 parts by weight of the resin type vulcanizing agent and 3 – 7 parts by weight of stannic chloride in the case of (4). In every case, however, if the amount of the vulcanizing agent blended is less than 1 part by weight, the vulcanization becomes insufficient and the mechanical properties of the resulting composition are deteriorated, while if the amount is more than 20 parts by weight, the electrical properties, thermal resistance and the like characteristics of the resulting composition and undesirably injured. Further, if the peroxide of (2) is used as the vulcanizing agent where an ethylene-propylene copolymer is used as the α-olefin polymer, even the ethylene-propylene copolymer is vulcanized with the result that the self-adhesiveness of the resulting composition comes to be injured. Accordingly, the peroxide of (2) is not usable as vulcanizing agent when an ethylene-propylene copolymer is used.

Further, a metal oxide such as ZnO, PbO, $Pb_3O_4$, MgO or CdO may be used in every case as a vulcanization adjuvant in an amount of 2 – 20 parts by weight per 100 parts by weight of the ethylene-propylene-diene terpolymer, whereby the vulcanization of the composition can be promoted. If necessary, it is, of course, not objectionable to use in combination small amounts of an antioxidant, a pigment such as carbon black, and a softener such as paraffinic process oil.

The composition of the present invention is obtained by mixing the above-mentioned components, except the vulcanizing agent, by means of, for example, a Banbury mixer at 150°– 180°C. for 10 – 15 minutes, adding the vulcanizing agent to the resulting mixture and then kneading the resulting mixture at 70°– 80°C. for about 5 minutes. The thus obtained composition of the present invention is rolled into a sheet by means of, for example, a calender roll for rubber. The sheet is rolled up on a cylinder while interposing a separator and then vulcanized by heating at a temperature of 140° to 150°C. for a period of 15 to 20 minutes. Subsequently, the vulcanized sheet is cut to a given width to obtain a self-adhesive insulating tape. If necessary, it is, of course, not objectionable that the composition is shaped into a thick sheet by means of a calender roll and then cut to a strip having a rectangular or triangular cross-section so as to be suitable for application.

The present invention is illustrated in further detail below with reference to examples.

Examples 1 to 13

The components set forth in each Example in Table 1 were mixed together according to an ordinary procedure by means of a Banbury mixer to obtain a composition. The thus obtained composition was shaped by means of a calender roll into a sheet having a thickness of 0.5 – 1 mm. The sheet was wound up in the form of a roll while interposing a separator, and a vulcanized rubber tape was wound around the outer periphery of the rolled sheet so that the sheet was not unrolled. Thereafter, the rolled sheet was placed in a vulcanizer and vulcanized by heating at 142°C. for 15 minutes. The characteristics of self-adhesive insulating tapes obtained in the above manner were as shown in Table 2.

TABLE 1

[All the numerals in the table are parts by weight]

| Example | 1 | 2 | 3 | 4 | 5 | 6 | 7 | 8 | 9 | 10 | 11 | 12 | 13 | Comparative |
|---|---|---|---|---|---|---|---|---|---|---|---|---|---|---|
| EPT (I) | 100 | | | 100 | 100 | 100 | 100 | | | | | 100 | 100 | |
| EPT (II) | | 100 | | | | | | 100 | 100 | | | | | |
| EPT (III) | | | 100 | | | | | | | 100 | 100 | | | |
| Butyl rubber | | | | | | | | | | | | | | 100 |
| Polyisobutylene (average molecular weight 100,000) | 100 | 100 | 100 | 100 | 100 | 50 | 125 | 100 | 100 | 100 | 100 | 100 | 100 | 100 |
| Polyisobutylene (average molecular weight 2,000) | 40 | | | 20 | 20 | 20 | 40 | 10 | 40 | 20 | 20 | 30 | 30 | 20 |
| YS resin oil D | | | 40 | | 20 | 20 | 20 | 20 | 20 | 10 | 40 | | | 20 |
| Coumarone-indene resin (average molecular weight 600) | | | | 40 | | | | 20 | | | | | | |
| Sumilite resin PR 22890 | | | | | 20 | | | | | | | 10 | 40 | |
| Platy talc | 150 | 150 | 150 | | | 70 | 170 | | | 150 | 120 | | | 150 |
| Calcined clay | | | | | 150 | | | | | | | | | |
| Dixie clay | | | | 150 | | | | 150 | 150 | | | 100 | 150 | |
| Mineral oil | | | | | | | | | | | | | | 40 |
| Zinc oxide | 5 | 5 | 5 | 5 | | 5 | 5 | 5 | 5 | 5 | 5 | 5 | 5 | 5 |
| M | 1.5 | 1.5 | 1.5 | 1.5 | 1.5 | 1.5 | 1.5 | 1.5 | 1.5 | 1.5 | 1.5 | 1.5 | 1.5 | |
| DZ | 2.0 | 2.0 | 2.0 | 2.0 | 2.0 | 2.0 | 2.0 | 2.0 | 2.0 | 2.0 | 2.0 | 2.0 | 2.0 | |
| TRA | 2.5 | 2.5 | 2.5 | 2.5 | 2.5 | 2.5 | 2.5 | 2.5 | 2.5 | 2.5 | 2.5 | 2.5 | 2.5 | |
| TT | | | | | | | | | | | | | | 2.0 |
| Sulfur | 0.1 | 0.1 | 0.1 | 0.1 | 0.5 | 0.1 | 0.1 | 0.1 | 0.1 | 0.1 | 0.1 | 0.1 | 0.1 | 1.0 |

In the above table, the components abbreviated to EPT and the like are such materials as mentioned below.

EPT (I): (EPT No. 1045; trade name of Mitsui Petrochemical Co.)
 Ethylene:propylene = 75:25 (molar ratio)
 Third component = dicyclopentadiene, 1.7 mole percent.
 Mooney viscosity ($ML_{1+4}$, 100°C.) = 34 – 39.

EPT (II): (Nordel No. 1040; trade name of Du Pont, U.S.A.)
 Ethylene:propylene = 66:34 (molar ratio)
 Third component = hexadiene-1,4, 1.6 mole percent.
 Mooney viscosity ($ML_{1+4}$, 100°C.) = 45 – 50

EPT (III): (Vistaron No. 2504; trade name of Esso Standard Co., U.S.A.)
 Ethylene:propylene = 51:49 – 61:39
 Third component = ethylidenenorbornene, 1.7 mole percent.
 Mooney viscosity ($ML_{1+4}$, 100°C.) = 45 – 50.

YS Resin Oil D: (trade name of Ishihara Sangyo Co.)
 Liquid terpene resin; average molecular weight = 350 – 400.

Sumilite Resin PS 22890: (trade name for a product of Sumitomo Chemical Co.)
 Novolak type phenol resin; average molecular weight = ca. 1,000.

M : Mercaptobenzothiazole.
BZ : Zinc-di-n-butyl dithiocarbamate.
TRA : Dipentamethylenethiuram tetrasulfide.
TT : Tetramethylthiuram disulfide.

Measurements according to the IEC-DIN modified method and DIP method set forth in Table 2 were carried out in the following manner:

IEC-DIN modified method:

Brass electrodes were placed at an interval of 4 mm. on a sample tape. Between the electrodes, a 0.1 percent $NH_4Cl$ solution was dropped at a rate of 1 drop per 30 seconds, while applying an electric pressure of 600 V between the electrodes. This operation was continued until a short circuit had been formed owing to carbonization of the tape, and the number of drops of the solution dropped until the formation of the short circuit was regarded as the tracking resistance of the tape. If no short circuit was formed even when the number of drops of the solution had become 101, the depth (mm.) of corrosion at that time was regarded as the tracking resistance.

DIP method:

A nichrome wire was attached near one end of a sample tape, and the other end of the sample was dipped in a 0.1 percent $NH_4Cl$ solution. Subsequently, the nichrome wire was vertically moved, together with the sample, between the solution surface and the position 20 – 25 mm. distant from the solution surface. The above vertical movement was effected while applying a voltage between the nichrome wire and the solution, and the voltage at which the sample was burned was measured.

The self-adhesivity was evaluated in the following manner:

A sample tape of 19 mm. in width was wound around a round rod, while applying a tension so that the width of the sample became about two-thirds. When the thickness of the tape wound and laminated around the rod had become 7 – 8 mm., the tape was allowed to stand for 15 minutes. Thereafter, the tape was cut with

TABLE 2

| Example | 1 | 2 | 3 | 4 | 5 | 6 | 7 | 8 | 9 | 10 | 11 | 12 | 13 | Comparative |
|---|---|---|---|---|---|---|---|---|---|---|---|---|---|---|
| Tensile strength (kg./cm.²) | 0.31 | 0.32 | 0.31 | 0.23 | 0.21 | 0.40 | 0.20 | 0.23 | 0.20 | 0.32 | 0.25 | 0.25 | 0.23 | 0.18 |
| Elongation, percent | 820 | 810 | 815 | 900 | 1,100 | 940 | 820 | 850 | 950 | 800 | 860 | 870 | 890 | 750 |
| Dielectric constant | 3.0 | 3.0 | 3.0 | 3.0 | 3.1 | 2.8 | 3.1 | 3.1 | 3.1 | 2.9 | 3.1 | 3.1 | 3.2 | 3.8 |
| Dielectric loss tangent, percent | 1.08 | 1.05 | 1.25 | 1.20 | 1.15 | 0.85 | 1.30 | 1.08 | 1.20 | 1.05 | 1.25 | 1.15 | 1.40 | 1.45 |
| Volume resistivity (Ω-cm.) | $4-7 \times 10^{13}$ | $2-3 \times 10^{13}$ | $0.9-2 \times 10^{13}$ | $0.5-3 \times 10^{13}$ | $1-4 \times 10^{13}$ | $3-6 \times 10^{13}$ | $0.9-3 \times 10^{13}$ | $2-6 \times 10^{13}$ | $1-3 \times 10^{13}$ | $3-6 \times 10^{13}$ | $0.9-2 \times 10^{13}$ | $1-2 \times 10^{13}$ | $0.8-1.0 \times 10^{13}$ | $0.6-1.0 \times 10^{13}$ |
| Breakdown voltage (kv./mm.) | 33 | 31 | 25 | 28 | 27 | 34 | 29 | 31 | 29 | 30 | 28 | 30 | 28 | 23 |
| IEC-DIN modified method (mm.) | 0.04 | 0.05 | 0.12 | 0.10 | 0.12 | 0.03 | 0.10 | 0.06 | 0.09 | 0.05 | 0.10 | 0.09 | 0.12 | 0.13 |
| DIP method (kv. > times) | 6.0>50 6.25>50 | 6.0>50 6.25>38 | 6.0>50 6.25>10 | 6.0>50 6.25>24 | 6.0>50 6.25>10 | 6.0>50 6.25>45 | 6.0>50 6.25>18 | 6.0>50 6.25>40 | 6.0>50 6.25>28 | 6.0>50 6.25>38 | 6.0>50 6.25>28 | 6.0>50 6.25>26 | 6.0>50 6.25>15 | 5.25>50 5.5>10 |
| Self-adhesiveness | Excellent | Excellent | Excellent | Excellent | Excellent | Excellent | Excellent | Excellent | Excellent | Excellent | Excellent | Excellent | Excellent | Excellent | a sharp razor and the state of the cross section thereof was observed. If the tape had been completely adhered and no interface between turns of the tape had been recognized at all, the tape was evaluated as being excellent in self-adhesiveness, while if interfaces between turns had been recognized though the turns had been adhered, the tape was evaluated as being favorable in self-adhesiveness.

Separately, the tape of Example 1 and that of Comparative Example were cut to strips, which were then subjected to degradation by means of a weather-ometer. Thereafter, the tracking resistance of said tapes was measured according to the IEC-DIN modified method to obtain results as shown in Table 3.

TABLE 3

| | Days of irradiation | | |
|---|---|---|---|
| | 10 ddays | 20 days | 30 days |
| Example 1 | 0.09 | 0.10 | 0.11 |
| Comparative Example | 0.27 | 0.31 | 0.34 |

(The numerals show the depths of corrosion.)

Examples 14 to 18

The components set forth in Table 4 were treated in the same manner as in Examples 1 – 13 to prepare self-adhesive insulating tapes, which were then subjected to measurement of characteristics to obtain results as shown in Table 5.

TABLE 4

| | Ex. 14 | Ex. 15 | Ex. 16 | Ex. 17 | Ex. 18 |
|---|---|---|---|---|---|
| EPT (I) | 100 | 100 | 100 | 100 | 100 |
| Ethylene-propylene copolymer | 50 | 75 | 100 | 50 | 125 |
| Polyisobutylene (average molecular weight 100,000) | | | | 50 | |
| Polyisobutylene (average molecular weight 2,000) | ' | + | ° | ° | + |
| YS Resin Oil D | 20 | 20 | 20 | 20 | |
| Platy talc | 100 | 100 | 100 | 100 | 100 |
| Paraffinic process oil | | | | | 10 |
| Carbon black | 1 | 1 | 1 | 1 | 1 |
| Zinc Oxide | 5 | 5 | 5 | 5 | 5 |
| M | 1.5 | 1.5 | 1.5 | 1.5 | 1.5 |
| BX | 2.0 | 2.0 | 2.0 | 2.0 | 2.0 |
| TRA | 2.5 | 2.5 | 2.5 | 2.5 | 2.5 |
| Sulfur | 0.1 | 0.1 | 0.1 | 0.1 | 0.1 |

The ethylene-propylene copolymer in Table 4 had an ethylene:propylene molar ratio of 60:40 – 50:50 and a Mooney viscosity ($ML_{1+4}$, 100°C.) of 45.

Other abbreviations are the same as in Table 1.

The tensile strength retention after heating, the elongation retention after heating and the ozone resistance in Table 5 were measured in the following manner:

Tensile strength retention after heating and elongation retention after heating:

A sample was heated in a Geer oven at 120°C. for 7 days and then subjected to measurements of tensile strength and elongation.

Ozone resistance:

A sample was stretched to 100 percent and allowed to stand for 20 hours. Thereafter, the sample was allowed to stand in a 0.044 vol. percent ozone atmosphere at room temperature, and the time required for formation of visible cracks was regarded as the ozone resistance. The IEC-DIN modified method and the self-adhesiveness evaluation were the same as in Table 2.

As is clear from the above Examples, self-adhesive tapes prepared from the present compositions have excellent elongation, thermal resistance, ozone resistance and electrical properties. Further, the present compositions are favorable in tackiness and plasticity, and hence can also be used as fillers between cores of multicore cables.

In addition to use for forming insulating layers for electric wires and cables, the self-adhesive tapes shaped from the present compositions are usable for the formation of, for example, corrosion resistant layers for metals.

We claim:

1. A self-adhesive and self-fusing electrical insulating tape prepared from the composition comprising:
   A. 100 parts by weight of an ethylene-propylene-diene terpolymer which is composed of ethylene and propylene in an ethylene:propylene molar ratio of 80:20 to 20:80 and a diene component in an amount of 0.5 to 10 mole percent based on the total amount of ethylene and propylene and which has a Mooney viscosity ($ML_{1+4}$, 100°C.) of 20 to 120,
   B. 50 to 150 parts by weight of an α-olefin polymer selected from the group consisting of ethylene-propylene copolymers which are composed of ethylene and propylene in an ethylene:propylene molar ratio of 60:40 to 40:80 and which have a Mooney viscosity ($ML_{1+4}$, 100°C.) of 20 – 120 and polyisobutylenes having an average molecular weight of 50,000 to 110,000,
   C. 10 to 80 parts by weight of a tackifier selected from the group consisting of polyisobutylenes having an average molecular weight of 300 to 10,000, terpene resins having an average molecular weight of 300 to 3,000, coumarone-indene resins having an average molecular weight of 400 to 1,200 and novolak type phenol resins having an average molecular weight of 200 to 1,300,

TABLE 5

| | Example 14 | Example 15 | Example 16 | Example 17 | Example 18 | Comparative example |
|---|---|---|---|---|---|---|
| Dielectric constant | 2.9 | 2.8 | 2.9 | 2.7 | 3.0 | 3.8 |
| Dielectric loss tangent (percent) | 1.10 | 1.05 | 1.00 | 0.96 | 1.15 | 1.45 |
| Volume resistivity (Ω-cm.) | 4–6×10¹⁵ | 3–5×10¹⁵ | 5–8×10¹⁵ | 4–7×10¹⁵ | 1–2×10¹⁵ | 0.6–1.0×10¹⁵ |
| Breakdown voltage (kv./mm.) | 35 | 34 | 32 | 32 | 31 | 23 |
| IEC-DIN modified method (mm.) | 0.03 | 0.05 | 0.06 | 0.06 | 0.09 | 0.13 |
| Tensile strength retention after heating (percent) | 95 | 93 | 90 | 88 | 85 | 70 |
| Elongation retention after heating (percent) | 85 | 83 | 81 | 80 | 78 | 60 |
| Ozone resistance (hrs.) | >64 | >64 | >64 | >64 | >64 | 12 |
| Self-adhesiveness | Excellent | Excellent | Excellent | Excellent | Excellent | Excellent |

D. 50 to 200 parts by weight of an inorganic filler having an average particle diameter of 0.5 to 50μ, and E. 1 to 20 parts by weight of a vulcanizing agent capable of vulcanizing only the ethylene-propylene-diene terpolymer in this composition, in which tape only component (A) has been vulcanized.

2. A composition according to claim 1, wherein the α-olefin polymer (B) is an ethylene-propylene copolymer which is composed of ethylene and propylene in an ethylene:propylene molar ratio of 60:40 to 40:60 and which has a Mooney viscosity of 20 to 120.

3. A composition according to claim 1, wherein the α-olefin polymer (B) is a polyisobutylene having an average molecular weight of 50,000 to 110,000.

4. A composition according to claim 1, wherein the tackifier is a polyisobutylene having an average molecular weight of 300 to 10,000 or a terpene resin having an average molecular weight of 300 to 3,000 and the amount thereof contained in the composition is 30 to 50 parts by weight per 100 parts by weight of the terpolymer.

5. A composition according to claim 4, which is in the form of a tape.

6. A self-adhesive insulating composition comprising:

A. 100 parts by weight of an ethylene-propylene-diene terpolymer which is composed of ethylene and propylene in an ethylene:propylene molar ratio of 40:60 to 80:20 and a diene component in an amount of 0.5 – 10 mole percent based on the total amount of ethylene and propylene and which has a Mooney viscosity ($ML_{1+4}$, 100°C.) of 20 – 120, B. 90 – 110 parts by weight of an α-olefin polymer selected from the group consisting of ethylene-propylene copolymers which are composed of ethylene and propylene in an ethylene:propylene molar ratio of 60:40 to 40:60 and which have a Mooney viscosity ($ML_{1+4}$, 100°C.) of 20 – 120 and polyisobutylene having an average molecular weight of 50,000 – 110,000, C. 30 – 50 parts by weight of a tackifier selected from the group consisting of polyisobutylenes having an average molecular weight of 300 – 10,000 and terpene resins having an average molecular weight of 300 – 3,000, D. 50 – 200 parts by weight of an inorganic filler having an average particle diameter of 0.5 – 50μ, and E. 1 – 20 parts by weight of a vulcanizing agent capable of vulcanizing only the ethylene-propylene-diene terpolymer in this composition.

7. The self-adhesive and self-fusing electrical insulating tape according to claim 1, wherein said α-olefin polymer is an ethylene-propylene copolymer which is composed of ethylene and propylene in an ethylene:propylene molar ratio of 60:40 to 40:60 and which has a Mooney viscosity ($ML_{1+4}$ 100°C) of 20–120 and said vulcanizing agent is selected from the group consisting of sulfur and a vulcanizing accelerator, p-quinone dioxime, p'-benzoyl quinone dioxime, a phenolic resin type vulcanizing agent and stannic chloride, and combinations thereof.

8. The self-adhesive and self-fusing electrical insulating tape according to claim 7, wherein said vulcanizing accelerator is selected from the group consisting of mercaptobenzothiazole, dimercaptobenzothiazole, and tetramethylthiuram monosulfide.

9. The self-adhesive and self-fusing electrical insulating tape according to claim 3, wherein said vulcanizing agent is selected from the group consisting of sulfur and a vulcanizing accelerator, p-quinone dioxime, p'-benzoyl quinone dioxime, a phenolic resin type vulcanizing agent and stannic chloride, a peroxide and combinations thereof.

10. The self-adhesive and self-fusing electrical insulating tape according to claim 9, wherein said peroxide is selected from the group consisting of dicumyl peroxide or t-butyl peroxide.

11. The self-adhesive and self-fusing electrical insulating tape according to claim 1, wherein said vulcanizing agent is a combination of sulfur with a vulcanizing accelerator in an amount of 0.1–3 parts by weight of sulfur and 0.5–3.5 parts by weight of said vulcanization accelerator, based on 100 parts by weight of said ethylene-propylene-diene terpolymer.

12. The self-adhesive and self-fusing electrical insulating tape according to claim 1, wherein said vulcanizing agent is selected from the group consisting of p-quinone dioxime and p,p'-benzoyl quinone dioxime and the amount of said vulcanizing agent is 3–7 parts by weight based on 100 parts by weight of the ethylene-propylene-diene terpolymer.

13. The self-adhesive and self-fusing electrical insulating tape according to claim 1, wherein said vulcanizing agent is a combination of a phenolic resin type vulcanizing agent with stannic chloride and said vulcanizing agent is used in an amount of 7–12 parts by weight of said resin type vulcanizing agent and 3–7 parts by weight of said stannic chloride.

14. The self-adhesive and self-fusing electrical insulating tape according to claim 13, wherein said resin type vulcanizing agent is a phenol resin type bromomethyl phenol-aldehyde resin.

15. The self-adhesive and self-fusing electrical insulating tape according to claim 1, wherein said vulcanizing agent is a peroxide and said α-olefin polymer is a polyisobutylene having a average molecular weight of 50,000 to 110,000, said peroxide being used in an amount of 2–4 parts by weight, based on 100 parts by weight of ethylene-propylene-diene terpolymer.

16. The self-adhesive and self-fusing electrical insulating tape according to claim 1, wherein a metal oxide in an amount of 2–20 parts weight per 100 parts by weight of the ethylene-propylene-diene terpolymer is used as a vulcanization adjuvant.

17. The self-adhesive and self-fusing electrical insulating tape according to claim 16, wherein said metal oxide is selected from the group consisting of ZnO, PbO, $Pb_3O_4$, MgO, and CdO.

18. The self-adhesive and self-fusing electrical insulating tape according to claim 1, wherein an antioxidant is present.

19. The self-adhesive and self-fusing electrical insulating tape according to claim 1, wherein a pigment is present.

20. The self-adhesive and self-fusing electrical insulating tape according to claim 1, wherein a softener is present.

21. The self-adhesive insulating composition according to claim 6, wherein said α-olefin polymer is an ethylene-propylene copolymer which is composed of ethylene and propylene in an ethylene:propylene molar ratio of 60:40 to 40:60 and which was a Mooney viscosity ($ML_{1+4}$, 100°C) of 20–120 and said vulcanizing agent is selected from the group consisting of sulfur and a vulcanizing accelerator, p-quinone dioxime, p'-benzoyl quinone dioxime, a phenolic resin type vulcanizing agent and stannic chloride, and combinations thereof.

22. The self-adhesive insulating composition according to claim 21, wherein said vulcanizing accelerator is selected from the group consisting of mercaptobenzothiazole, dimercaptobenzothiazole, and tetramethylthiraum monosulfide.

23. The self-adhesive insulating composition according to claim 6, wherein said α-olefin is the polyisobutylene and said vulcanizing agent is selected from the group consisting of sulfur and a vulcanizing accelerator, p-quinone dioxime, p'-benzoyl quinone dioxime, a phenolic resin type vulcanizing agent and stannic chloride, a peroxide and combinations thereof.

24. The self-adhesive insulating composition according to claim 23, wherein said peroxide is selected from the group consisting of dicumyl peroxide and t-butyl peroxide.

25. The self-adhesive insulating composition according to claim 6, wherein said vulcanizing agent is a combination of sulfur with a vulcanizing accelerator in an amount of 0.1–3 parts by weight of sulfur and 0.5–3.5 parts by weight of said vulcanization accelerator, based on 100 parts by weight of said ethylene-propylene-diene terpolymer.

26. The self-adhesive insulating composition according to claim 6, wherein said vulcanizing agent is selected from the group consisting of p-quinone dioxime and p,p'-benzoyl quinone dioxime and the amount of said vulcanizing agent is 3.7 parts by weight based on 100 parts by weight of the ethylene-propylene-diene terpolymer.

27. The self-adhesive insulating composition according to claim 6, wherein said vulcanizing agent is combination of a phenolic resin type vulcanizing agent with stannic chloride and said vulcanizing agent is used in an amount of 7–12 parts by weight of said resin type vulcanizing agent and 3–7 parts by weight of said stannic chloride.

28. The self-adhesive insulating composition according to claim 27, wherein said resin type vulcanizing agent is a phenol resin type bromomethyl phenol-aldehyde resin.

29. The self-adhesive insulating composition according to claim 6, wherein said vulcanizing agent is a peroxide and said α-olefin polymer is a polyisobutylene having an average molecular weight of 50,000 to 110,000 said peroxide being used in an amount of 2–4 parts by weight, based on 100 parts by weight of ethylene-propylene-diene-terpolymer.

30. The self-adhesive insulating composition according to claim 6, wherein a metal oxide in an amount of 2–20 parts by weight per 100 parts by weight of the ethylene-propylene-diene terpolymer is used as a vulcanization adjuvant.

31. The self-adhesive insulating composition according to claim 30, wherein said metal oxide is selected from the group consisting of ZnO, PbO, $Pb_3O_4$, MgO, and CdO.

32. The self-adhesive insulating composition according to claim 6, wherein an antioxidant is present.

33. The self-adhesive insulating composition according to claim 6, wherein a pigment is used.

34. The self-adhesive insulating composition according to claim 6, wherein a softener is used.

* * * * *